United States Patent
Yao et al.

(10) Patent No.: US 11,079,463 B2
(45) Date of Patent: Aug. 3, 2021

(54) METHOD AND DEVICE FOR POSITION DETERMINATION (71) Applicant: FORSCHUNGSZENTRUM JUELICH GmbH, Juelich (DE)

(72) Inventors: Yu Yao, Herzogenrath (DE); Stefan Van Waasen, Hueckelhoven (DE); Renhai Xiong, Dueren (DE); Michael Schiek, Aachen (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 287 days.

(21) Appl. No.: 16/330,768

(22) PCT Filed: Sep. 15, 2017

(86) PCT No.: PCT/DE2017/000300
§ 371 (c)(1),
(2) Date: Mar. 6, 2019

(87) PCT Pub. No.: WO2018/064994
PCT Pub. Date: Apr. 12, 2018

(65) Prior Publication Data
US 2019/0187237 A1    Jun. 20, 2019

(30) Foreign Application Priority Data
Oct. 8, 2016  (DE) ............... 10 2016 012 101.7

(51) Int. Cl.
*G01S 1/04* (2006.01)
*G01S 5/02* (2010.01)
(Continued)

(52) U.S. Cl.
CPC ............ *G01S 5/0226* (2013.01); *G01S 1/042* (2013.01); *G01S 1/045* (2013.01); *G01S 1/22* (2013.01); *G01S 5/14* (2013.01); *G01S 5/145* (2013.01)

(58) Field of Classification Search
CPC . G01S 1/042; G01S 1/045; G01S 1/22; G01S 5/0252; G01S 5/02; G01S 5/021; G01S 5/0226; G01S 5/14; G01S 5/145
(Continued)

(56) References Cited

U.S. PATENT DOCUMENTS 6,748,224 B1    6/2004 Chen et al.
6,952,181 B2 *  10/2005 Karr ............... G01C 21/206
                                                          342/457
(Continued)

FOREIGN PATENT DOCUMENTS

DE    60216027 T2    6/2007
DE    69535615 T2    7/2008
(Continued)

*Primary Examiner* — Harry K Liu
(74) *Attorney, Agent, or Firm* — Leydig, Voit & Mayer, Ltd.

(57) ABSTRACT

A method for the determining a position of at least one measurement object equipped with a mobile station having a receiver includes employing at least four reference objects having a base station and a transmitter, wherein a first reference object of the at least four reference objects has a mobile station with a receiver and simultaneously acts as a measurement object. The base station and the mobile station are structurally combined. The reference objects initially have a known position that can change. The transmitters of the base stations transmit signals and the mobile stations receive signals. The method additionally includes emitting, by at least two transmitters of base stations, periodic signals
(Continued)

of different frequencies at mutually defined time intervals, wherein these frequencies are closely adjacent.

15 Claims, 4 Drawing Sheets

(51) Int. Cl.
  *G01S 1/22* (2006.01)
  *G01S 5/14* (2006.01)
(58) Field of Classification Search
  USPC .......................................................... 342/451
  See application file for complete search history.

(56) References Cited

U.S. PATENT DOCUMENTS

| | | |
|---|---|---|
| 7,215,698 B2 | 5/2007 | Darby et al. |
| 8,432,867 B2 | 4/2013 | Bolgiano et al. |
| 2005/0185656 A1* | 8/2005 | Svensson .............. H04W 24/02 |
| | | 370/398 |
| 2007/0002932 A1 | 1/2007 | Shirai et al. |
| 2007/0042706 A1 | 2/2007 | Ledeczi et al. |
| 2009/0243932 A1 | 10/2009 | Moshfeghi |
| 2014/0111379 A1 | 4/2014 | Schelten et al. |
| 2015/0365790 A1* | 12/2015 | Edge ........................ G01S 1/20 |
| | | 455/404.2 |

FOREIGN PATENT DOCUMENTS

| | | |
|---|---|---|
| DE | 102011107333 A1 | 1/2013 |
| JP | S 5970979 A | 4/1984 |
| JP | 2000180186 A | 6/2000 |
| JP | 2005201655 A | 7/2005 |
| JP | 2016053551 A | 4/2016 |

\* cited by examiner

METHOD AND DEVICE FOR POSITION DETERMINATION

CROSS REFERENCE TO RELATED APPLICATIONS

This application is a U.S. National Stage Application under 35 U.S.C. § 371 of International Application No. PCT/DE2017/000300 filed on Sep. 15, 2017, and claims benefit to German Patent Application No. DE 10 2016 012 101.7 filed on Oct. 8, 2016. The International Application was published in German on Apr. 12, 2018, as WO 2018/064994 A1 under PCT Article 21(2).

FIELD

The invention relates to a method and a device for position determination.

BACKGROUND

From the prior art, various methods are known for determining the position of objects.

The GPS method is very often used in everyday life—for example, to navigate vehicles. At least four transmitters are used; such transmitters are in orbit around the earth and were synchronized before they left the ground. Such transmitters transmit synchronous signals, which also contain information regarding their position. The object to be navigated has a receiver that picks up the signals and determines its own position from them. In doing so, relativistic effects are taken into account. The method is described, for example, in the publication, www.navcen.uscg.gov/pubs/gps/gpsuser/gpsuser.pdf.

An additional method is described in patent application DE 10 2011 107 333 A1 of the applicant. This method enables the positioning of objects in enclosed spaces, down to distances on a laboratory scale. An object, the position of which is to be determined, thereby transmits a signal whose frequency is known, and several receivers, the positions of which are known, determine the phase of the signal and derive the position of the transmitter from it.

The publication, "A 5.8 GHz Local Positioning and Communication System," Mosshammer et al. (2007), IEEE/MTT-S International Microwave Symposium, pp. 1237-1240, reveals a method for determining the position of an object, in which the object, the position of which is to be determined, emits a signal that changes its frequency in terms of time and that is received and returned by base stations. The object receives the returned signal and registers the amplitude as a function of the frequency.

SUMMARY

In an embodiment, the present invention provides a method for the determining a position of at least one measurement object equipped with a mobile station having a receiver. The method includes employing at least four reference objects having a base station and a transmitter, wherein a first reference object of the at least four reference objects has a mobile station with a receiver and simultaneously acts as a measurement object. The base station and the mobile station are structurally combined. The reference objects initially have a known position that can change. The transmitters of the base stations transmit signals and the mobile stations receive signals. The method additionally includes emitting, by at least two transmitters of base stations, periodic signals of different frequencies at mutually defined time intervals, wherein these frequencies are closely adjacent.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

There are disadvantages associated with methods according to the prior art. The GPS method works in buildings to only a limited extent. With the method according to DE 10 2011 107 333 A1, the number of objects whose position can be determined is limited. With the method of Mosshammer et al., the signals of the base stations can be received only successively, the utilization of the bandwidth is inefficient, a synchronization between base station and the object, the position of which is to be determined, is necessary, and the base station and the object must both transmit and receive. The fundamental problem in buildings is that signals are reflected by walls.

Embodiments of the invention provide methods and devices for overcoming disadvantages of certain prior art. Embodiments of the invention enable accurate positioning of objects in places where other positioning systems do not have sufficient accuracy or signal strength, e.g., in buildings and rooms, in densely built-up areas, or underground, even if objects to be located are buried in the ground. In particular, a position determination of objects located in buildings or rooms shall be made possible. The measuring rate is increased relative to certain prior art. It can be on the scale of one measurement per second up to 1,000 measurements per second, or higher. The accuracy of the position determination is to be increased—particularly compared to the GPS method. Embodiments of the invention are capable of being used for simultaneous determination of a position of any number of objects. Problems caused by reflections of signals on walls are to be reduced or prevented.

According to the invention, it is now possible to enable the positioning of objects at locations whether other positioning systems do not have sufficient accuracy or signal strength, e.g., in buildings and rooms, in densely built-up areas, or underground, even if objects to be located are buried in the ground. In particular, the position in buildings or rooms can be determined with very high spatial accuracy and a high measuring rate. The positions of multiple objects of any number can be determined simultaneously. Measurement problems caused by the reflection of signals on walls can be reduced or eliminated.

In the following, the invention is described in its general form, without this being interpreted restrictively.

According to the invention, at least one object, the position of which is to be determined, is equipped with a mobile station having a receiver. The object with a mobile station and a receiver is referred to as a measurement object.

An object in the sense of the invention is any object or any living being whose position is to be determined.

Furthermore, an object in the sense of the invention can also be part of an object or a living being, e.g., the wrist of a person, or the tip of a finger, or the knee of a person. In its simplest embodiment, the object can also be the housing of a mobile station.

At least four objects are used, each of which is equipped with a base station that has a transmitter. Hereinafter, objects that have a base station with a transmitter are referred to as "reference objects." In this case, the object is the housing of a base station.

Reference objects may also be equipped with a mobile station.

Objects, the positions of which are to be determined, can also be equipped with base stations, and also belong to the reference objects. In this case, the reference objects have base stations and mobile stations that can be physically combined in one device and have a transmitter and receiver. The number of objects or measurement objects, the positions of which are to be determined, can take any value. For example, 2, 3, 4, 5, 6, . . . 10, . . . 20, 50 . . . 100 or more objects can be determined with respect to their position.

The reference objects, and therefore also the base stations with transmitters that belong to the reference objects, have a fixed position, which can also change. The positions of the reference objects are determined or defined prior to operation, so that the coordinates at which the reference objects are located are known. At least four reference objects are required to carry out the procedure, but more than four, e.g., 5, 6, 7, 8, 9, 10, 20 . . . 50 or more, may be present. The higher the number of reference objects, the more accurate is the position determination.

The transmitters of the reference objects transmit at defined time intervals, e.g., synchronously or at fixed time intervals, which can be partially synchronous.

According to the invention, at least two transmitters of at least four base stations of the reference objects transmit signals of different frequencies, which are closely adjacent and which have a periodic pattern.

Closely-spaced frequencies are set apart less than the bandwidth of the signals used. In particular, they may be set apart less than the reciprocal period duration of the signals used. This has the advantage that the phase of the signals can be used more easily for refining the position determination, and the available frequency range is used efficiently.

The closely-spaced frequencies of the transmitters of the base stations of the reference objects behave in relation to each other according to formula 1

$$|f_n - f_m| \bmod \Delta f \neq 0 \quad \text{(formula 1)}$$

The following are used in formula 1:
$f_n$—the frequency of a transmitter of any base station of a reference object,
$f_m$—the frequency of a transmitter of any other base station of a reference object, and
$\Delta f$—the frequency spacing between the maxima in the Fourier spectrum of the signals used.

In doing so, the period durations of the periodic patterns must be selected in such a manner that $\Delta f$ is the same for the transmitters of the base stations of the reference objects, the frequencies of which are closely spaced.

Advantageously, base station transmitters of reference objects that transmit on closely-spaced frequencies use transmission signals with the same periodic pattern. This has the advantage that the comparison of signals from different base station transmitters of reference objects becomes easier.

The periodic patterns have the advantage that the transmitted signals have discrete Fourier spectra with narrow, clearly formed maxima.

However, it is also conceivable that closely adjacent frequencies at least partly feature different periodic patterns.

The periodic patterns can be freely chosen and can be varied.

For example, the transmission signals of base station transmitters can be pulsed with a defined timing.

The duration of the pulses can be freely selected. The spacing between the pulses can also be freely selected.

The phase and/or amplitude can undergo continuous or discontinuous changes—for example, in the form of an increase or decrease or a sudden change in amplitude or phase.

In one embodiment of the invention, at least four base stations of the reference objects have transmitters that all transmit synchronously on closely adjacent frequencies.

In an additional embodiment, all base stations of the reference objects have transmitters that transmit synchronously to closely adjacent frequencies.

In an additional embodiment, there are groups of reference objects, the base stations of which have at least one transmitter that transmits on closely adjacent frequencies within the group, wherein the frequency ranges of the groups are set far apart.

In an additional embodiment, at least two transmitters of base stations of the reference objects transmit signals whose frequencies are set far apart.

Frequencies that are set far apart should have a frequency difference that is greater than the bandwidth of the signals used. This has the advantage that different transmitters are easily distinguishable from each other.

In an additional embodiment, some of the at least four base stations of the reference objects have at least one transmitter, which transmits synchronously at frequencies that are set far apart.

In an additional embodiment, at least two of the at least four base stations of the reference objects have a transmitter that emits time-shifted signals. These can have the same frequencies, but not all transmitters of the base stations of the reference objects that emit time-shifted signals have to transmit the same frequency.

Electromagnetic waves can be used as transmission signals. In principle, radio waves, IR waves, light, and, in particular, radio waves with frequencies in range of the ISM bands can be considered as transmission signals.

The following combinations of base stations of the reference objects shown in Table 1, in which the base stations are abbreviated with BS, can be used by way of example, but are not restrictive.

TABLE 1

| Number of BS | Number of different frequencies available | Number of closely adjacent frequencies per subgroup | Number of subgroups with frequencies that are set far apart | Number of available time windows |
|---|---|---|---|---|
| 8 | 4 | 2 | 2 | 2 |
| 12 | 6 | 1 | 6 | 2 |
| 12 | 6 | 6 | 1 | 2 |
| 12 | 12 | 4 | 3 | 1 |
| 8 | 8 | 8 | 1 | 1 |

Furthermore, combinations of frequencies and time windows shown in Tables 2 and 3 can be used without restriction. In Tables 2 and 3, $M_1$, $M_2$, and $M_3$ are different periodic patterns, and $f_1$, $f_2$, $f_3$, and $f_4$ are different frequencies. The frequencies $f_1$ and $f_2$, along with $f_3$ and $f_4$, are closely adjacent. The frequency pairs $f_1$, $f_2$ and $f_3$, $f_4$ are set far apart.

TABLE 2

|       | $t_1$        | $t_2$        | $t_3$        |
|-------|--------------|--------------|--------------|
| $f_1$ | $BS_1(M_1)$  | $BS_5(M_3)$  | $BS_7(M_1)$  |
| $f_2$ | $BS_2(M_1)$  | $BS_6(M_3)$  |              |
| $f_3$ | $BS_3(M_2)$  |              | $BS_8(M_2)$  |
| $f_4$ | $BS_4(M_2)$  |              |              |

TABLE 3

|       | $t_1$        | $t_2$        | $t_3$           |
|-------|--------------|--------------|-----------------|
| $f_1$ | $BS_1(M_1)$  | $BS_5(M_1)$  | $BS_9(M_1)$     |
| $f_2$ | $BS_2(M_1)$  | $BS_6(M_1)$  | $BS_{10}(M_1)$  |
| $f_3$ | $BS_3(M_1)$  | $BS_7(M_1)$  | $BS_{11}(M_1)$  |
| $f_4$ | $BS_4(M_1)$  | $BS_8(M_1)$  | $BS_{12}(M_1)$  |

In an advantageous embodiment, at least some of the reference objects—but at least three, and, preferably, all reference objects—are equipped, in addition to the base station with a transmitter, with mobile stations having a receiver. The base station and the mobile station can be combined into one device. This allows any reference object with a mobile station to receive the signals of all other reference objects. Thereby, the distance between the reference objects with mobile stations and all other reference objects can be determined. The distance values can be used to determine the positions of the reference objects in relation to a coordinate system spanned by any three of the at least four reference objects with mobile stations. This has the advantage that no external aids are required to determine the positions of all reference objects.

In an additional embodiment, the system may also have zero measurement objects. However, one or more measurement objects can also be used. Furthermore, not all reference objects have to be stationary, and they are equipped with mobile stations in addition to the base stations. This allows each reference object to receive the signals of all other reference objects. This allows the distance between all pairs of reference objects to be determined. In this embodiment, the system is able to detect the changes in the relative positions of the reference objects to each other. If measurement objects are present, their position is also determined relative to the reference objects.

A method sequence according to the invention is described below.
1. At least four reference objects, whose positions are initially known but can change, transmit signals at defined time intervals that are synchronous or at least partially time-shifted. At least two of the at least four reference objects transmit on closely adjacent frequencies, the transmission signals of which feature a periodic pattern.
2. The receivers of the mobile stations of the measurement objects or of the reference objects according to point 2, which also have a mobile station, which can be structurally combined with the mobile station, receive the signals of the reference objects.
3. The mobile stations of the measurement objects or the reference objects, which also have a mobile station, separate frequencies that are set far apart and any noise that may be present. For this purpose, methods known from the prior art, such as the use of bandpass filters or low-pass filters, can be used.
4. Signals of the reference objects with closely adjacent frequencies with periodic patterns are separated from the mobile stations of the measurement objects or the reference objects, which have a mobile station, making use of the periodicity of the patterns. This can be done by means known to the person skilled in the art, such as comb filters or Fourier transforms.
5. The mobile stations measure the point in time of arrival of the signals from all reference objects. Each mobile station can calculate its position from such points in time. The suitable methods for this are, according to the prior art, known—for example, from the GPS method. In order to increase the accuracy of the arrival time measurement, a time-shifted sub-sampling of the received signals can be used. The phase position of the incoming signals can be used to refine the position determination.

A device according to the invention has at least four reference objects, each equipped with base stations with a transmitter and with means for synchronizing the clocks of the base stations, along with at least one object or measurement object, which has a mobile station having a receiver. The object with a mobile station can also be one of the at least four reference objects. In this case, the object has a base station and a mobile station, which may possibly be structurally combined, along with a transmitter and a receiver. At least two of the base stations have transmitters with means for emitting signals with periodic patterns transmitted on closely adjacent frequencies. At least one base station may have a means for emitting signals to another base station at frequencies that are set far apart. The mobile stations have means for separating closely-spaced frequencies and may have means for separating frequencies that are set far apart. The means for separating frequencies that are set far apart can be bandpass filters or low-pass filters, for example. The means for separating closely-spaced frequencies may be comb filters or means for performing a Fourier transform.

In a preferred embodiment, at least some of the reference objects—but at least three, and, preferably, all reference objects—have an additional mobile station having a receiver.

Figure 1:
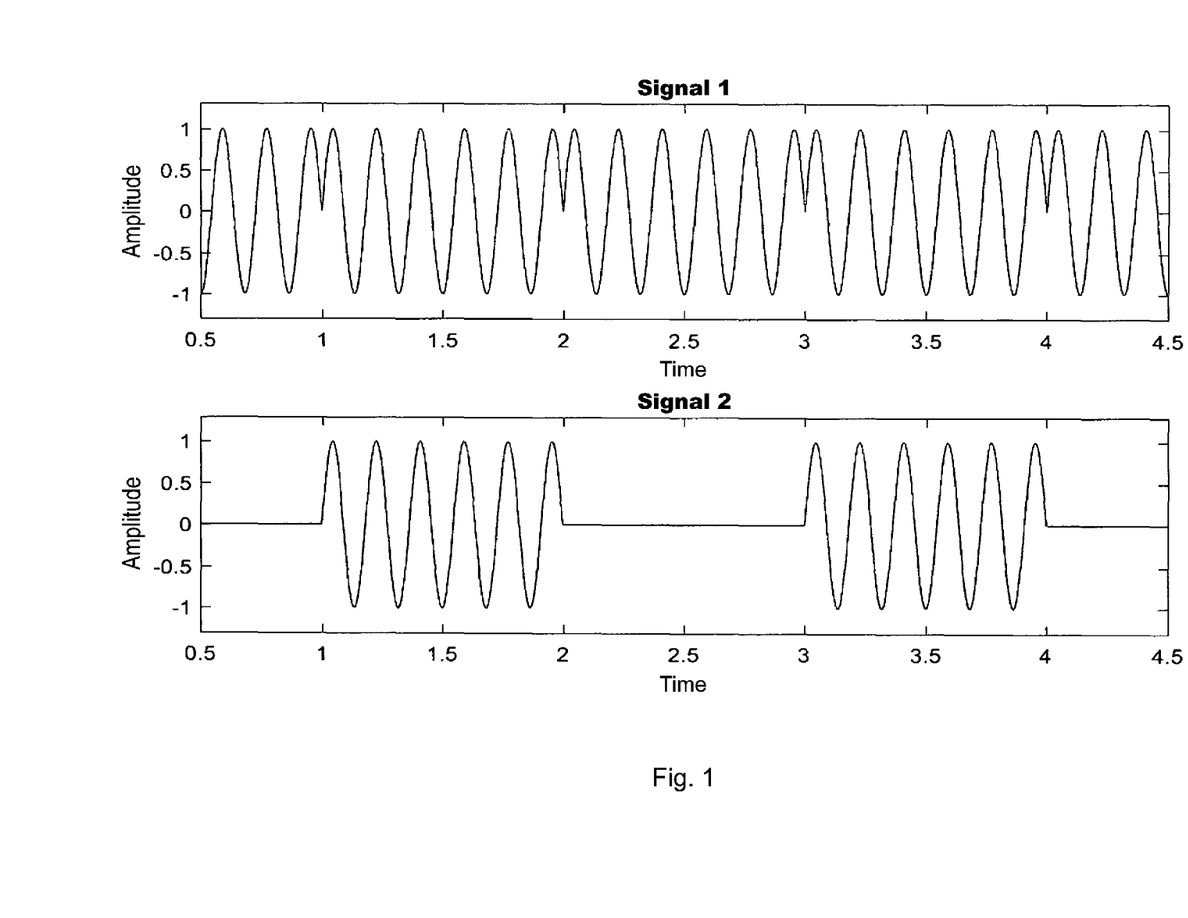
FIG. 1 provides examples of two transmission signals with periodic patterns.

FIG. 1 shows examples of two suitable transmission signals with periodic patterns. Signal 1 is phase-modulated, and signal 2 is amplitude-modulated. In FIG. 1, the x-axis designates the time in [s], and the y-axis designates the amplitude.

Figure 2:
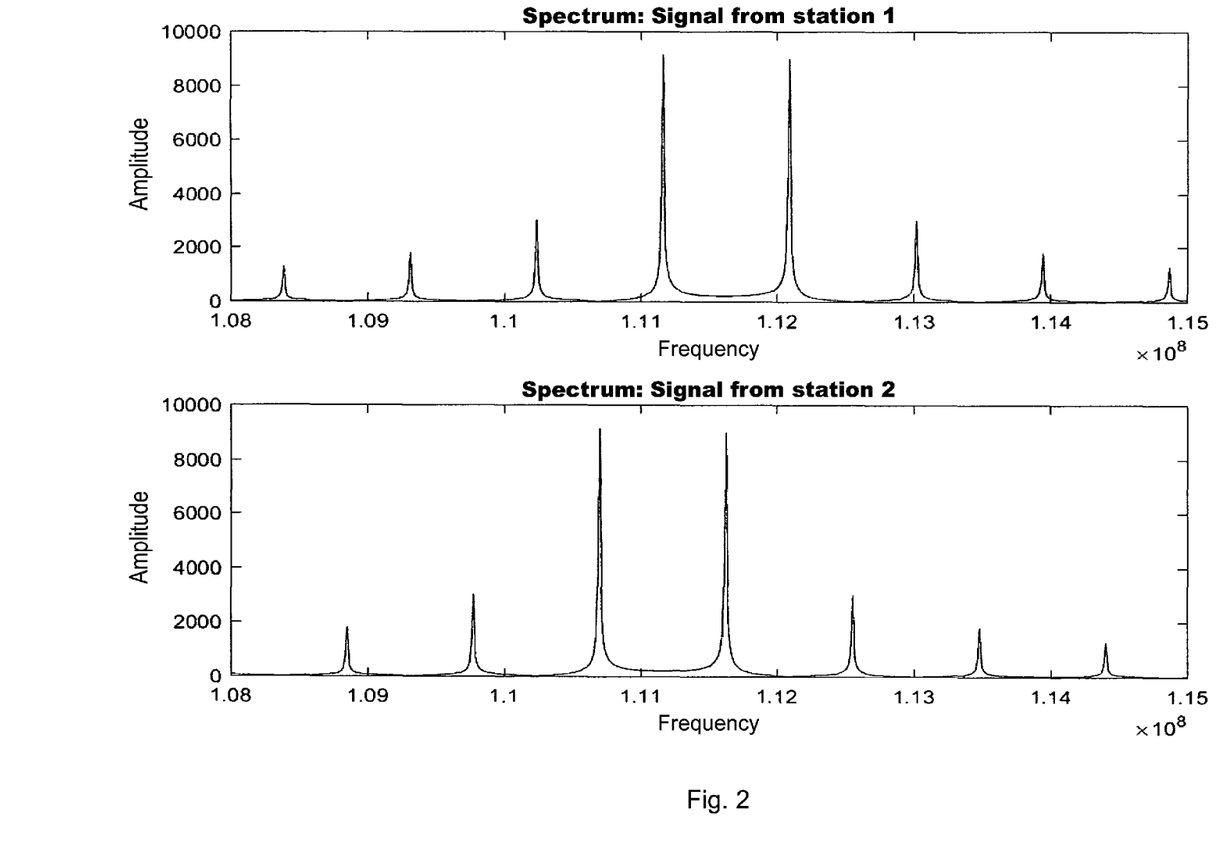
FIG. 2 provides the spectrum of transmitted signals from transmitters of two reference objects whose frequencies are close to each other.

FIG. 2 shows the amplitude curve of the spectrum of transmitted signals of two base stations whose frequencies are close to each other. In FIG. 2, the x-axis designates the frequency in [Hz], and the y-axis designates the amplitude.

Figure 3:
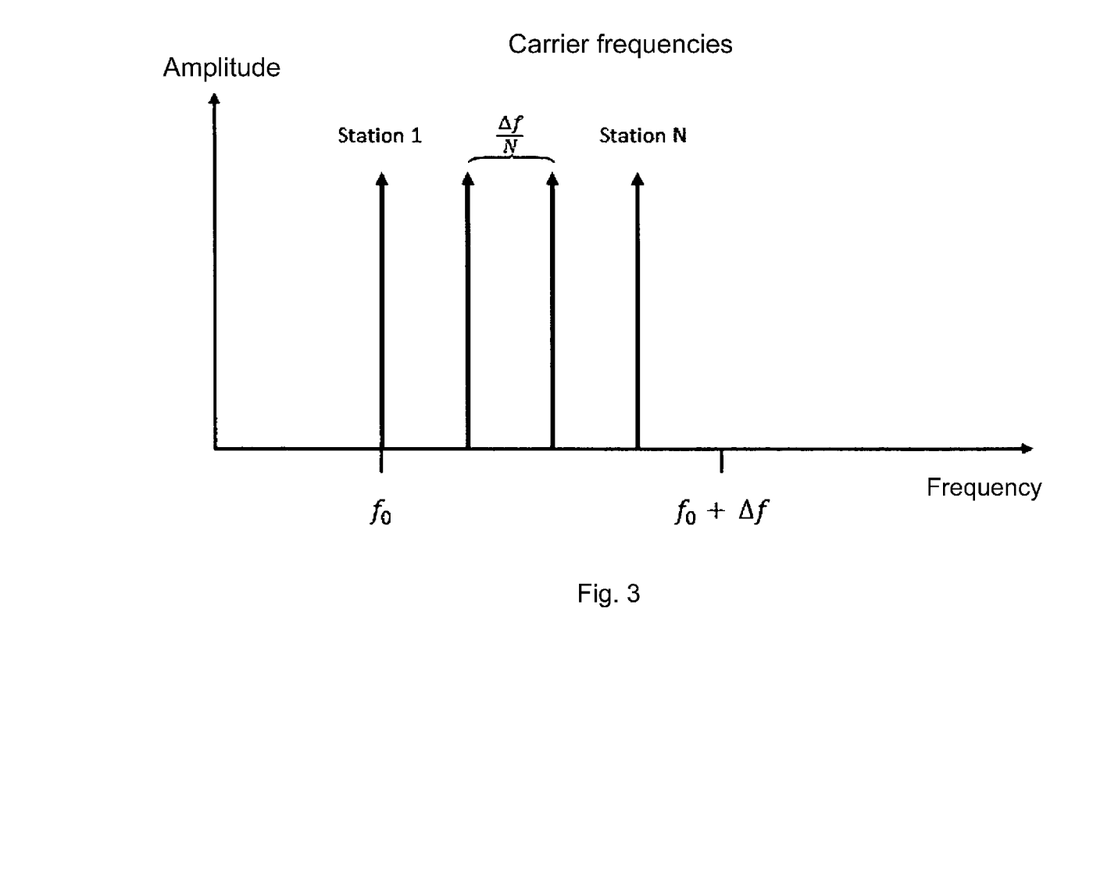
FIG. 3 provides carrier frequencies of N transmitters of different reference objects whose frequencies are close to each other.

FIG. 3 shows the carrier frequencies of N transmitters that satisfy formula 1. Thereby, $\Delta f$ is the frequency spacing between the maxima in the Fourier spectrum of the signals used; $f_0$ designates the frequency of one of the base stations. In FIG. 3, the x-axis designates the frequency in [Hz], and the y-axis designates the amplitude.

Figure 4:
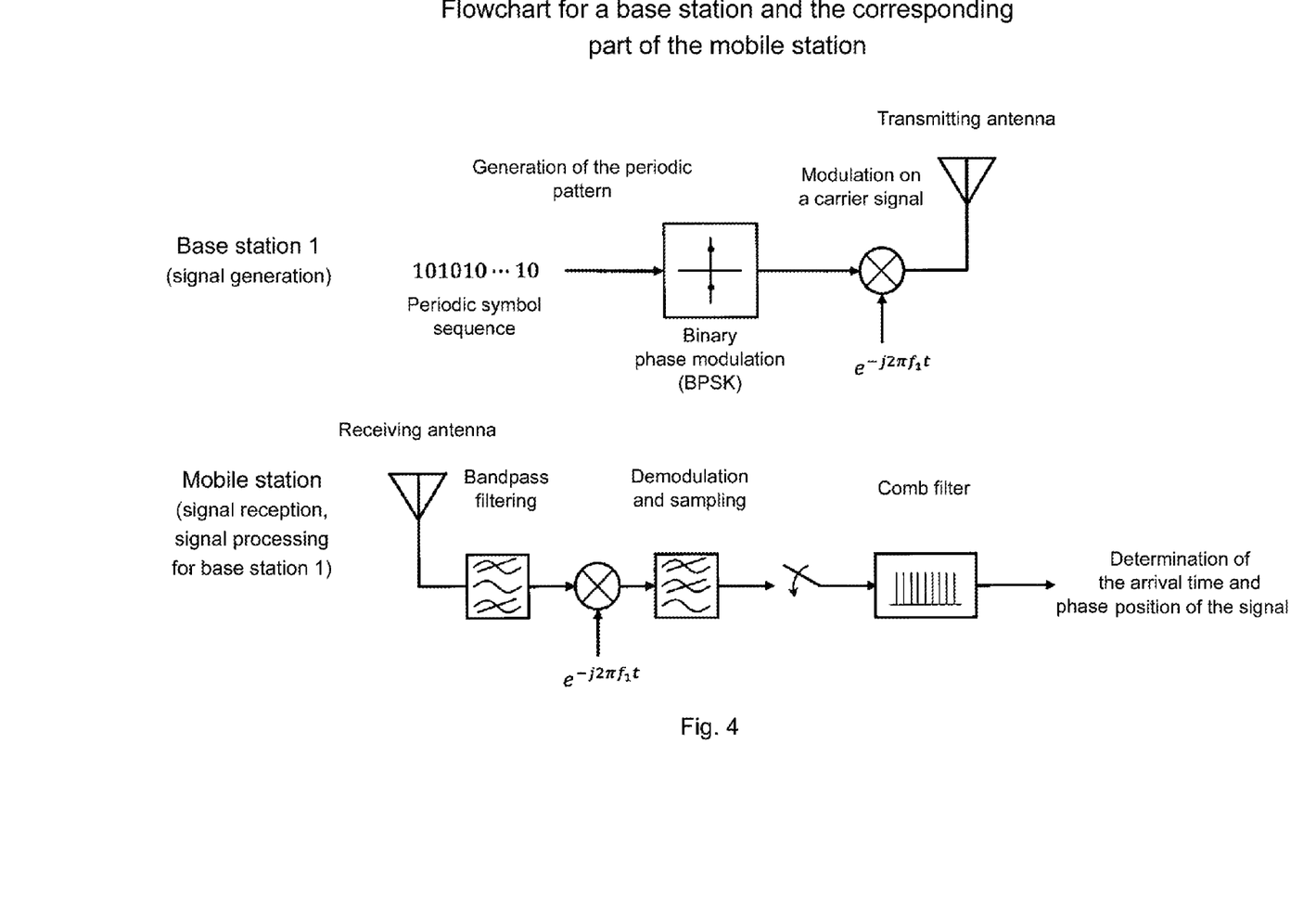
FIG. 4 provides a flowchart for a possible realization of signal generation in a base station and of signal processing in part of a mobile station responsible for the base station.

FIG. 4 shows a flowchart describing a possible realization of the signal generation in a base station, along with a possible realization of the receiver and the signal processing in the part of a mobile station responsible for this base station. A periodic symbol sequence is converted into a periodic pattern using binary phase shift keying. The periodic pattern is modulated and transmitted on a carrier signal of the desired frequency $f_1$. The mobile stations receive the signal and carry out a bandpass filtering, which suppresses noise and signals at distant frequencies. The signal is demodulated and sampled. A comb filter is used to separate the signal from the signals of other reference objects that transmit on closely adjacent frequencies. The arrival time and phase position of the signal are then determined.

In the following, parameters are given for an example, with which parameters a method according to the invention can be carried out, without this being interpreted restrictively.

16 reference objects with base stations, which are synchronized in terms of time, are set up at fixed positions. All base stations transmit signals with the same periodic pattern. Two base stations each transmit on the same frequency with a time delay, such that a total of eight different frequencies are transmitted. The first four and the last four of these frequencies are closely adjacent to each other. From the group of the last four frequencies, the group of the first four frequencies is set far apart. The ISM bands at 2 GHz and 5.8 GHz can be used as frequency ranges. For example, the frequencies of the first group can be in the 2 GHz band, and those of the second group can be in the 5.8 GHz band.

The mobile stations receive the signals of the base stations and separate signals on frequencies that are set far apart with bandpass filters. Signals transmitted on closely adjacent frequencies can be separated with comb filters. Signals transmitted on the same frequency have a time offset and do not influence each other.

The mobile stations use time-delayed sub-sampling to sample the signals of the base station at high rates, and to determine the arrival time of the signals. The position of the mobile station can be determined from the arrival times using methods known from the prior art, such as the GPS method. In addition, the phase position of the incoming signals can be used to increase the accuracy of the position determination.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for the determining a position of at least one measurement object equipped with a mobile station having a receiver, the method comprising:
    employing at least four reference objects, each reference object having a base station and a transmitter, wherein a first reference object of the at least four reference objects has a mobile station structurally combined with the base station, the mobile station having a receiver, wherein the first reference object simultaneously acts as a measurement object, wherein the reference objects initially have a known position that can change, and wherein the transmitters of the base stations are configured to transmit signals and the mobile station is configured to receive signals, and
    emitting, by at least two transmitters of base stations, periodic signals of first different frequencies at mutually defined time intervals, wherein the different frequencies are separated by less than one bandwidth of signals used.

2. The method according to claim 1, wherein the different frequencies behave according to the formula $|f_n - f_m|$ mod $\Delta f \neq 0$,
    wherein:
    $f_n$ is the frequency of a transmitter of any base station,
    $f_m$ is the frequency of a transmitter of any other base station, and
    $\Delta f$ is the frequency spacing between maxima in a Fourier spectrum of signals used.

3. The method according to claim 2, wherein period durations are selected in such a manner that the frequency spacing $\Delta f$ is the same for the transmitters of the base stations that emit the different frequencies.

4. The method according to claim 1, wherein the signals transmitted by the transmitters of the base stations are pulsed with a defined timing.

5. The method according to claim 1, wherein a phase and/or amplitude of the periodic signals are changed continuously or discontinuously.

6. The method according to claim 1, wherein at least two transmitters of the base stations transmit signals of second different frequencies, wherein the second different frequencies have a frequency difference that is greater than a bandwidth of the signals used.

7. The method according to claim 1, wherein at least two transmitters of the base stations transmit signals that are time-shifted.

8. The method according to claim 1, wherein a phase position of the incoming signals of the transmitters of the base stations is used to refine a position determination.

9. The method according to claim 1, wherein a time-delayed sub-sampling of the received signals is carried out.

10. The method according to claim 1, wherein at least some of the reference objects in addition to the first reference object are equipped with mobile stations having a receiver configured to receive signals from other reference objects.

11. A system for determining a position of a measurement object having a mobile station and a receiver, the system comprising: at least four reference objects each equipped with a base station having a synchronizer configured to synchronize with other base stations and a transmitter, wherein a position of each of the plurality of reference objects is initially known and can change, wherein a first reference object includes the mobile station and the receiver and additionally acts as the measurement object, wherein the base station of the first reference object and the mobile station are structurally combined in one device, and wherein at least two base stations have transmitters configured to emit signals with periodic patterns transmitted on first different frequencies, the first different frequencies being separated by less than one bandwidth of signals used.

12. The device according to claim 11, wherein at least two base stations are configured to emit signals on second different frequencies, the second different frequencies having a frequency difference that is greater than a bandwidth of the signals used.

13. The device according to claim 11, wherein the mobile station includes a signal processor configured to separate closely-spaced frequencies and/or frequencies that are set far apart.

14. A method for the determining a position of at least one measurement object equipped with a mobile station having a receiver, the method comprising:
   employing at least four reference objects having a base station and a transmitter, wherein a first reference object of the at least four reference objects has a mobile station with a receiver, wherein the first reference object simultaneously acts as a measurement object, wherein the base station and the mobile station are structurally combined, wherein the reference objects initially have a known position that can change, and wherein the transmitters of the base stations transmit signals and the mobile stations receive signals,
emitting, by at least two transmitters of base stations, periodic signals of different frequencies at mutually defined time intervals, wherein the different frequencies are separated by less than one bandwidth of signals used,
   wherein a phase position of the incoming signals of the transmitters of the base stations is used to refine a position determination.

15. The method according to claim 14, wherein at least two transmitters of the base stations transmit signals of second different frequencies, wherein the second different frequencies have a frequency difference that is greater than a bandwidth of the signals used.

* * * * *